3,152,109
ISOTHIURONIUM SALTS OF SOLUBLE
2-HALOETHYLTHIO DYESTUFFS
David Taber, Pittsburgh, Pa., assignor to American
Aniline Products, Inc., a corporation of Maryland
No Drawing. Filed Dec. 18, 1961, Ser. No. 160,235
5 Claims. (Cl. 260—144)

This invention relates to new dyestuffs and to the coloration of cellulosic and other textile materials therewith. In one specific aspect, it relates to new water-soluble dyestuffs containing at least one isothiuronium salt of a 2-haloethylthio group.

In recent years there has been considerable interest in the manufacture of water-soluble dyestuffs containing triazine or pyrimidine rings to which there are attached reactive halogen atoms. No dyestuffs have been heretofore described which contain an isothiuronium salt of a 2-haloethylthio group attached to a water-soluble dyestuff moiety.

I have found that unexpectedly superior water-soluble dyestuffs can be made from dyestuffs containing at least one 2-haloethylthio group or groups convertible to 2-haloethylthio groups, such as 2-hydroxyethylthio and mercapto groups, by converting the 2-haloethylthio group to its isothiuronium salt. My new dyestuffs, when applied to cellulosic or other textiles by dyeing or printing in the presence of an acid-binding agent, give colorations which have good fastness to wet treatments.

It is therefore an object of the present invention to provide a new class of water-soluble dyestuffs solubilized by the presence of at least one ionogenic solubilizing group and at least one isothiuronium salt of a 2-haloethylthio group.

In accordance with the invention, I have discovered dyestuffs of the formula:

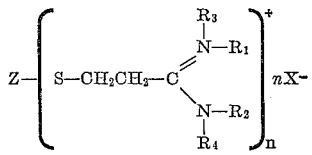

wherein Z is a water-soluble colored moiety of the azo, anthraquinone, phthalocyanine or nitro series as recognized by the Colour Index, 2nd edition, 1956; $n$ is a small whole number having a value of from 1–3; $R_1$ and $R_2$, as individual substituents, are members selected from the group consisting of hydrogen and lower alkyl and, taken collectively, they represent an alkylene bridge having from 2–3 carbon atoms, said bridge connecting the N atoms to which $R_1$ and $R_2$ are attached; $R_3$ and $R_4$ are hydrogen or lower alkyl; and X is a member selected from the group consisting of chlorine or bromine. The Z term, representing the dyestuff moiety, contains one or more ionogenic solubilizing groups, such as sulfonic or carboxylic acid groups.

The new water-soluble dyestuffs are made by the interaction of one mole of a water-soluble colorant of the azo, anthraquinone, phthalocyanine or nitro series having at least one 2-haloethylthio group, with at least one mole of a thiourea per 2-haloethylthio group.

The water-soluble intermediates of the azo series suitable for making the dyestuffs of the invention are made by (1) diazotizing an arylamine containing at least one 2-haloethylthio or 2-hydroxyethylthio group with any suitable coupling component containing at least one ionogenic solubilizing groups, or (2) diazotizing an arylamine, free of thio groups, but containing ionogenic solubilizing groups, and coupling the diazonium salt with a coupling component containing at least one 2-haloethylthio or 2-hydroxyethylthio group. In obvious modifications of the above methods, it is possible for the solubilizing groups to be attached to the component bearing the sulfur-containing group or to both components.

Mercapto groups can be converted to 2-haloethylthio groups by reacting the mercaptan with ethylene oxide or ethylene chlorohydrin to convert the mercapto group to a 2-hydroxyethylthio group. After the coupling reaction, the 2-hydroxyethylthio group can be converted to the 2-chloro- or 2-bromoethylthio group with concentrated hydrochloric or hydrobromic acid. It is also possible to convert the mercaptan to the corresponding disulfide by air oxidation and, after diazotizing and coupling, cleaving the disulfide to two moles of mercaptan. The mercaptan thus obtained can be reacted with an ethylene dihalide to give the 2-bromo or 2-chloroethyl sulfide.

Useful amines containing 2-haloethylthio or 2-hydroxyethylthio groups can be made from nitrothiophenols by reacting a nitrothiophenol with ethylene oxide or ethylene chlorohydrin to form nitrophenyl-2-hydroxyethyl sulfides, which can be converted to 2-haloethyl sulfides by reaction with hydrochloric or hydrobromic acid or with thionyl chloride. The nitro group is reduced to an amino group either before or after the conversion of the hydroxy group to a halo group. Alternatively, these intermediates can be made from acetamidothiophenols by a similar process followed by the hydrolysis of the acetamido group to give a free amino group. The reaction of the amino 2-haloethyl sulfide with a thiourea, e.g., N,N,N',N'-tetramethylthiourea, can be conducted before or after the coupling reaction.

Useful arylamines containing 2-haloethylthio groups include 4-aminopheneyl 2'-chloroethyl sulfide,
3-aminophenyl 2'-chloroethyl sulfide,
2-aminophenyl 2'-chloroethyl sulfide,
4-amino-2-chlorophenyl 2'-chloroethyl sulfide,
4-amino-3-chlorophenyl 2'-chloroethyl sulfide,
3-amino-4-chlorophenyl 2'-chloroethyl sulfide,
4-amino-2-methylphenyl 2'-chloroethyl sulfide,
4-amino-3-methylphenyl 2'-chloroethyl sulfide,
4-amino-2-trifluoromethylphenyl 2'-chloroethyl sulfide,
4-amino-2-nitrophenyl 2'-chloroethyl sulfide,
4-amino-2-nitrophenyl 2'-chloroethyl sulfide,
4-amino-2-bromophenyl 2'-chloroethyl sulfide,
4-amino-2-chloro-6-methylphenyl 2'-chloroethyl sulfide,
4-amino-1-naphthyl-2-bromo 2'-chloroethyl sulfide,
2-amino-2-bromo-1-naphthyl 2'-chloroethyl sulfide,
4-amino-1-anthraquinonyl 2'-chloroethyl sulfide,
1-amino-2-anthraquinonyl 2'-chloroethyl sulfide,
1-amino-4-hydroxy-2-anthraquinonyl 2'-chloroethyl sulfide,
4-(4'-aminophenylazo)phenyl 2'-chloroethyl sulfide,
2-amino-4-nitrophenyl 2'-chloroethyl sulfide,
2-amino-4-nitrophenyl 2'-chloroethyl sulfide,
3-amino-4-nitrophenyl 2'-chloroethyl sulfide,
2-amino-3-chloro-5-nitrophenyl 2'-chloroethyl sulfide,
2-amino-3-hydroxy-4-nitrophenyl 2'-chloroethyl sulfide,
4-amino-3-chloro-1-naphthyl 2'-chloroethyl sulfide,
1-amino-2-naphthyl 2'-chloroethyl sulfide and the 2-bromoethyl sulfides corresponding to these 2-chloroethyl sulfides.

Useful arylamines bearing 2-hydroxyethylthio groups include 4-aminophenyl 2'-hydroxyethyl sulfide,
3-aminophenyl 2'-hydroxyethyl sulfide,
2-aminophenyl 2'-hydroxyethyl sulfide,
4-amino-2-chlorophenyl 2'-hydroxyethyl sulfide,
4-amino-3-chlorophenyl 2'-hydroxyethyl sulfide,
3-amino-4-chlorophenyl 2'-hydroxyethyl sulfide, 4-amino-2-methylphenyl 2′-hydroxyethyl sulfide,
4-amino-3-methylphenyl 2′-hydroxyethyl sulfide,
4-amino-2-trifluoromethylphenyl 2′-hydroxyethyl sulfide,
4-amino-2-nitrophenyl 2′-hydroxyethyl sulfide,
4-amino-2-bromophenyl 2′-hydroxyethyl sulfide,
4-amino-2-chloro-6-methylphenyl 2′-hydroxyethyl sulfide,
4-amino-2-bromo-1-naphthyl 2′-hydroxyethyl sulfide,
2-amino-2-bromo-1-naphthyl 2′-hydroxyethyl sulfide,
4-amino-1-anthraquinonyl 2-hydroxyethyl sulfide,
1-amino-2-anthraquinonyl 2′-hydroxyethyl sulfide,
1-amino-4-hydroxy-2-anthraquinonyl 2′-hydroxyethyl sulfide and
4-(4′-aminophenylazo)phenyl 2′-hydroxyethyl sulfide.

Also useful are 2-amino-4-nitrophenyl 2′-hydroxyethyl sulfide,
2-amino-4-nitrophenyl 2′-hydroxyethyl sulfide,
3-amino-4-nitrophenyl 2′-hydroxyethyl sulfide,
2-amino-3-chloro-5-nitrophenyl 2′-hydroxyethyl sulfide,
2-amino-3-hydroxy-4-nitrophenyl 2′-hydroxyethyl sulfide,
4-amino-3-(2-hydroxyethylthio)biphenyl,
4-amino-3-chloro-1-naphthyl 2′-hydroxyethyl sulfide, and
1-amino-2-naphthyl 2′-hydroxyethyl sulfide.

Useful arylamino mercaptans which can be converted to the 2-hydroxyethylthio or 2-haloethylthio groups, as described hereabove, include 4-acetaminothiophenol,
3-acetaminothiophenol 2-acetaminothiophenol,
5-acetamino-2-hydroxythiophenol,
2-acetamino-4-nitrothiophenol,
2-acetamino-5-nitrothiophenol,
4-acetamino-4-nitrothiophenol,
3-acetamino-4-nitrothiophenol,
2-acetamino-3-chloro-5-nitrothiophenol,
2-acetamino-3-hydroxy-5-nitrothiophenol,
2-acetamino-3,5-dinitrothiophenol,
4-acetamino-2-chlorothiophenol,
4-acetamino-3-chlorothiophenol,
3-acetamino-4-chlorothiophenol,
2-acetamino-4-chlorothiophenol,
4-acetamino-2-methylthiophenol,
4-acetamino-3-methylthiophenol,
4-acetamino-2-trifluoromethylthiophenol,
4-acetamino-2-nitrothiophenol,
4-acetamino-2-chloro-6-methylthiophenol,
2-acetamino-1-mercaptonaphthalene,
2-acetaminomercaptonaphthalene,
4-amino-1-mercaptoanthraquinone,
1-amino-2-mercaptoanthraquinone,
1-amino-4-hydroxy-2-mercaptoanthraquinone, and the amino compounds corresponding to the acetamino compounds first listed. After conversion to the 2-hydroxyethylthio or 2-haloethylthio groups, the acetamino compounds are hydrolyzed to the amines.

The arylamines having 2-haloethylthio or 2-hydroxyethylthio groups set forth hereabove are diazotized and coupled with a suitable coupling component which contains at least one ionogenic solubilizing group. By using the amines containing the 2-haloethylthio group, the compounds of the invention can be made directly by the coupling reaction. The 2-hydroxyethylthio group can be converted, by methods described hereabove, to the 2-haloethylthio group to form the compounds of the invention.

Suitable coupling components containing sulfonic acid or carboxylic acid groups include N-[m-(3-methyl-5-oxo-2-pyrazolin-1-yl)-phenylsulfonyl]-anthranilic acid,
4,6-diamino-m-benzenedisulfonic acid,
4-chloro-3-(3-methyl-5-oxo-2-pyrazolin-1-yl)benzenesulfonic acid,
5-chloro-2-(3-methyl-5-oxo-2-pyrazolin-1-yl)benzenesulfonic acid,
2,5-dichloro-4-(3-methyl-5-oxo-2-pyrazolin-1-yl)benzenesulfonic acid,
2,4-dihydroxybenzenesulfonic acid,
o-(5-oxo-3-phenyl-2-pyrazolin-1-yl)benzenesulfonic acid,
2,4,5-trichloro-3-(3-methyl-5-oxo-2-pyrazolin-1-yl)benzenesulfonic acid,
p-(2,4-diaminophenoxy)-benzoic acid,
m-(5-hydroxy-7-sulfo-2-naphthylamino)benzoic acid,
p-(8-hydroxy-6-sulfo-2-naphthylamino)benzoic acid,
2-(p-α-acetylacetamidophenyl)-6-methyl-7-benzothiazolesulfonic acid,
6-methyl-2-[p-(3-methyl-5-oxo-2-pyrazolin-1-yl)phenyl]-7-benzothiazolesulfonic acid,
2,3-cresotic acid,
2,4-cresotic acid,
gallic acid,
N-(3-amino-4-chlorophenyl)glycine,
N-(m-aminophenyl)glycine,
N-(3-amino-4-sulfophenyl)glycine,
N-(5-amino-o-tolyl)glycine,
N-(8-hydroxy-3,6-disulfo-1-naphthyl)glycine,
N-(5-hydroxy-7-sulfo-2-naphthyl)glycine,
N-1-naphthylglycine,
N-phenylglycine,
N-acetoacetyl-4-methoxymetanilic acid,
N,N-diethylmetanilic acid,
ethyl 7-hydroxy-3-sulfo-1-naphthalenecarbamate,
6-amino-1,3-naphthalenedisulfonic acid,
6-(3-methyl-5-oxo-2-pyrazolin-1-yl)-1,2-naphthalenedisulfonic acid,
3-(3-methyl-5-oxo-2-pyrazolin-1-yl)-1,5-napththalenedisulfonic acid,
3-amino-2,6-naphthalenedisulfonic acid,
3-amino-2,7-naphthalenedisulfonic acid,
4,5-diamino-2,7-naphthalenedisulfonic acid,
4,5-dihydroxy-2,7-naphthalenedisulfonic acid,
8-anilino-1-naphthalenesulfonic acid,
4,6-dihydroxy-1-naphthalenesulfonic acid,
4,5-diamino-1-napththalenesulfonic acid,
8-p-toluidino-1-naphthalenesulfonic acid,
5-amino-2-naphthalenesulfonic acid,
6-amino-2-naphthalenesulfonic acid,
8-amino-2-naphthalenesulfonic acid,
5-amino-6-ethoxy-2-naphthalenesulfonic acid,
7-(2-aminoethylamino)-2-naphthalenesulfonic acid,
6-(2,4-diaminophenoxy)-2-naphthalenesulfonic acid,
4,6-dihydroxy-2-naphthalenesulfonic acid,
6-(3-methyl-5-oxo-2-pyrazolin-1-yl)-2-naphthalenesulfonic acid,
4,6,7-trihydroxy-2-naphthalenesulfonic acid,
naphthionic acid,
1,7-dihydroxy-4-sulfo-2-naphthoic acid,
3,5-dihydroxy-7-sulfo-2-naphthoic acid,
1-hydroxy-2-naphthoic acid,
1-hydroxy-7-sulfo-2-naphthoic acid,
1-naphthol-2,7-disulfonic acid,
8-acetamido-1-naphthol-3,5-disulfonic acid,
6-amino-1-naphthol-3,5-disulfonic acid,
8-amino-1-naphthol-3,5-disulfonic acid,
8-benzamido-1-naphthol-3,5-disulfonic acid,
8-(2,4-dichlorobenzamido)-1-naphthol-3,5-disulfonic acid,
8-(6-hydroxy-2-naphthylsulfonamido)-1-naphthol-3,5-disulfonic acid,
1-naphthol-3,6-disulfonic acid,
8-acetamido-1-naphthol-3,6-disulfonic acid,
8-amino-1-naphthol-3,6-disulfonic acid,
8-(p-aminobenzamido)-1-naphthol-3,6-disulfonic acid,
8-benzamido-1-naphthol-3,6-disulfonic acid,
8-chloro-1-naphthol-3,6-disulfonic acid,
8-ethoxy-1-naphthol-3,6-disulfonic acid,
8-phenylsulfonamido-1-naphthol-3,6-disulfonic acid, 1-naphthol-3,7-disulfonic acid,
1-naphthol-3,8-disulfonic acid,
1-naphthol-4,8-disulfonic acid,
8-amino-1-naphthol-5,7-disulfonic acid,
2-naphthol-3,6-disulfonic acid,
2-naphthol-3,7-disulfonic acid,
2-naphthol-6,8-disulfonic acid,
1-naphthol-3-sulfonic acid,
6-acetamido-1-naphthol-3-sulfonic acid,
6-(p-acetamidophenylureido)-1-naphthol-3-sulfonic acid,
5-amino-1-naphthol-3-sulfonic acid,
7-(p-aminobenzamido)-1-naphthol-3-sulfonic acid,
6-[m-(p-aminobenzamido)benzamido]-1-naphthol-3-sulfonic acid,
6-[p-(p-aminobenzamido)benzamido]-1-naphthol-3-sulfonic acid,
6-(4-amino-3-methylbenzamido)-1-naphthol-3-sulfonic acid,
6-anilino-1-naphthol-3-sulfonic acid,
6-(p-benzamidoanilino)-1-naphthol-3-sulfonic acid,
6-(α-chloroacetamido)-1-naphthol-3-sulfonic acid,
6-(2,4-dimethoxyanilino)-1-naphthol-3-sulfonic acid,
7-dimethylamino-1-naphthol-3-sulfonic acid,
6,6'-iminobis-1-naphthol-3-sulfonic acid,
7-(p-methoxyanilino)-1-naphthol-3-sulfonic acid,
6-(p-nitrobenzamido)-1-naphthol-3-sulfonic acid,
8-sulfamyl-1-naphthol-3-sulfonic acid,
7-(2-sulfoethylamino)-1-naphthol-3-sulfonic acid,
1-naphthol-4-sulfonic acid,
1-naphthol-5-sulfonic acid,
8-amino-1-naphthol-5-sulfonic acid,
8-benzamido-1-naphthol-5-sulfonic acid,
8-chloro-1-naphthol-5-sulfonic acid,
1-naphthol-8-sulfonic acid,
2-naphthol-4-sulfonic acid,
8-anilino-2-naphthol-6-sulfonic acid,
2-naphthol-7-sulfonic acid,
3-amino-2-naphthol-7-sulfonic acid,
2-naphthol-8-sulfonic acid,
1-naphthol-2,4,7-trisulfonic acid,
1-naphthol-3,6,8-trisulfonic acid,
2-naphthol-3,6,8-trisulfonic acid,
1-phenol-2-sulfonic acid,
1-phenol-3-sulfonic acid,
3-amino-1-phenol-4-sulfonic acid,
1-(6-chloro-4-sulfo-o-tolyl)-5-oxo-2-pyrazoline-3-carboxylic acid ethyl ester,
1(m-nitrophenyl)-5-oxo-2-pyrazoline-3-carboxylic acid,
5-oxo-1-(o-sulfophenyl)-2-pyrazoline-3-carboxylic acid,
5-oxo-1-(p-sulfophenyl)-2-pyrazoline-3-carboxylic acid,
1-(p-aminophenyl)-3-methyl-5-pyrazolone,
β-resorcylic acid,
3-methyl-β-resorcylic acid,
salicylic acid,
3-amino-salicylic acid,
5-(5-hydroxy-7-sulfo-2-naphthylamino)salicylic acid,
3-(3-methyl-5-oxo-2-pyrazolin-1-yl)-5-sulfo salicylic acid,
N-acetoacetylsulfanilic acid,
N-butyl-N-phenyltaurine,
N-ethyl-N-phenyltaurine,
4-(N-benzylanilino)-m-toluenesulfonic acid,
and 4 - (3 - methyl - 5 - oxo - 2 - pyrazolin - 1 - yl)-m-toluenesulfonic acid.

As noted hereabove, the alternative method for making the azo compounds of the invention involves the use of an arylamine, free of sulfur-containing groups, containing at least one ionogenic solubilizing group. Such useful arylamines include 6-amino-3-acenapthenesulfonic acid,
4,4'-diamino-3,3'-biphenylenebis(oxyacetic acid),
anthranilic acid,
N-(2-carboxysulfanilyl)-anthranilic acid,
3-chloroanthranilic acid,
3,5-dichloroanthranilic acid,
5-nitroanthranilic acid,
4-sulfoanthranilic acid,
1-amino-2-anthraquinonecarboxylic acid,
1-amino-4-bromo-2-anthraquinonecarboxylic acid,
1-amino-4-nitro-2-anthraquinonecarboxylic acid,
5-acetamido-1-amino-4-bromo-2-anthraquinonesulfonic acid,
1-amino-4-(p-aminoanilino)-2-anthraquinonesulfonic acid,
1-amino-4-bromo-2-anthraquinonesulfonic acid,
1-amino-4-methylamino-2-anthraquinonesulfonic acid,
2,5-diamino-m-benzenedisulfonic acid,
2-amino-p-benzenedisulfonic acid,
5-acetamido-2-aminobenzenesulfonic acid,
5-acetoamino-2-amino-4-methoxybenzenesulfonic acid,
o-aminobenzenesulfonic acid,
5-amino-2-anilinobenzenesulfonic acid,
2-(p-aminoanilino)-5-nitrobenzenesulfonic acid,
2-amino-4-chlorobenzenesulfonic acid,
2-amino-3-chloro-5-nitrobenzenesulfonic acid,
p-(2-amino-4-chlorophenoxy)benzenesulfonic acid,
2-amino-4,5-dichlorobenzenesulfonic acid,
2-amino-3,5-dinitrobenzenesulfonic acid,
2-amino-5-ethoxybenzenesulfonic acid,
2-amino-4-formamidobenzenesulfonic acid,
2-amino-5-nitrobenzenesulfonic acid,
2-amino-5-(m-nitrobenzamido)benzenesulfonic acid,
p-(p-aminophenylazo)benzenesulfonic acid,
5-amino-2-o-toluidinobenzenesulfonic acid,
3,5-diamino-4-chlorobenzenesulfonic acid,
m-amino-benzoic acid,
p-aminobenzoic acid,
5-amino-2-chlorobenzoic acid,
3-amino-5-sulfobenzoic acid,
2-(p-aminophenyl)-7-sulfo-6-benzothiazolecarboxylic acid,
2-(p-aminophenyl)-6-methyl-7-benzothiazolesulfonic acid,
2-(4-amino-3-sulfophenyl)-6-methyl-7-benzothiazolesulfonic acid,
4,4'-diaminobibenzyl-2,2'-disulfonic acid,
4,4'-diamino-3,3'-biphenyldicarboxylic acid,
4,4'-diamino-5,5'-dimethoxy-2,2'-biphenyldisulfonic acid,
4,4'-diamino-3,3'-biphenyldisulfonic acid,
4-amino-3-biphenylsulfonic acid,
4,4'-diamino-3-biphenylsulfonic acid,
5-amino-2,3-cresotic acid,
5-(p-aminobenzamido)-2,3-cresotic acid,
3,7-diamino-4,6-dibenzothiophenedisulfonic acid-5,5-dioxide,
N-(3-amino-4-chlorophenyl)glycine,
N-(3-amino-4-sulfophenyl)glycine,
N-(5-amino-o-tolyl)glycine,
metanilic acid,
6-(p-aminophenoxy)metanilic acid,
4-chlorometanilic acid,
6-ethoxymetanilic acid,
6-(N-ethylacetamido)metanilic acid,
4-methoxymetanilic acid,
4-methoxy-6-nitrometanilic acid,
6,6'-oxydimetanilic acid,
6-phenoxymetanilic acid,
7-amino-1,3-naphthalenedisulfonic acid,
3-amino-1,4-naphthalenedisulfonic acid,
2-amino-1,6-naphthalenedisulfonic acid,
4-amino-1,7-naphthalenedisulfonic acid,
3-amino-2,6-naphthalenedisulfonic acid,
4,8-diamino-2,6-naphthalenedisulfonic acid,
1-amino-2,7-naphthalenedisulfonic acid,
4-amino-2,7-naphthalenedisulfonic acid,
3,6-diamino-2,7-naphthalenedisulfonic acid,
6-amino-1-naphthalenesulfonic acid, 5-(5-amino-o-tolylsulfonamido)-1-naphthalenesulfonic acid,
4,5-diamino-1-naphthalenesulfonic acid,
4-acetoxy-8-amino-2-naphthalenesulfonic acid,
1-amino-2-naphthalenesulfonic acid,
6-amino-2-naphthalenesulfonic acid,
7-amino-2-naphthalenesulfonic acid,
5-amino-6-ethoxy-2-naphthalenesulfonic acid,
1,4-diamino-2-naphthalenesulfonic acid,
4-amino-3-sulfonaphthalic anhydride,
naphthionic acid,
6-amino-1-naphthol-3,5-disulfonic acid,
7-amino-1-naphthol-3,6-disulfonic acid,
5-amino-1-naphthol-3-sulfonic acid,
7-amino-1-naphthol-3-sulfonic acid,
7-(p-aminobenzamido)-1-naphthol-3-sulfonic acid,
6-[m-(m-aminobenzamido)benzamido]-1-naphthol-3-sulfonic acid,
6-amino-5-chloro-1-naphthol-3-sulfonic acid,
1-amino-6-nitro-2-naphthol-4-sulfonic acid,
3-amino-2-naphthol-7-sulfonic acid,
1-amino-2-naphthol-8-sulfonic acid,
2-(m-aminophenyl)-6-hydroxynaphthol[2,1]thiazole-8-sulfonic acid,
2-(p-aminophenyl)-6-hydroxynaphthol[2,1]thiazole-8-sulfonic acid,
p-aminooxanilic acid,
4-amino-5-chloro-2-methoxyoxanilic acid,
3-amino-4-methyloxanilic acid,
3-amino-2-methyl-5-sulfooxanilic acid,
4-amino-3-sulfooxanilic acid,
4-amino-1-phenol-2,6-disulfonic acid,
4-acetamido-6-amino-1-phenol-2-sulfonic acid,
5-amino-1-phenol-2-sulfonic acid,
6-amino-4-chloro-1-phenol-2-sulfonic acid,
4-amino-6-nitro-1-phenol-2-sulfonic acid,
6-(5-amino-o-tolylsulfonamido)-4-chloro-1-phenol-2-sulfonic acid,
2-amino-1-phenol-4-sulfonic acid,
2-amino-6-chloro-1-phenol-4-sulfonic acid,
2-amino-3,6-dichloro-1-phenol-4-sulfonic acid,
2,6-diamino-1-phenol-4-sulfonic acid,
1-(p-aminophenyl)-3-methyl-5-pyrazolone,
3-aminosalicylic acid,
5-aminosalicylic acid,
5-(p-aminobenzamido)-salicylic acid,
5-(m-aminobenzamido)-3-sulfosalicylic acid,
5-(3-amino-4-methyl-benzamido)salicylic acid,
3-(m-aminophenylsulfonamido)-5-sulfosalicylic acid,
3-amino-5-sulfosalicylic acid,
5-amino-3-sulfosalicylic acid,
5-(2-amino-4-sulfophenylsulfonyl)salicylic acid,
4-amino-4'-nitro-2,2'-stilbenedisulfonic acid,
4,4'-diamino-2,2'-stilbenedisulfonic acid,
sulfanilic acid,
3-chlorosulfanilic acid,
3-methoxysulfanilic acid,
3-nitrosulfanilic acid,
N-(p-aminophenyl)-N-methyltaurine,
4-amino-m-toluenesulfonic acid,
6-amino-m-toluenesulfonic acid,
4-amino-5-chloro-m-toluenesulfonic acid,
6-amino-4-chloro-m-toluenesulfonic acid,
5-amino-6-hydroxy-m-toluenesulfonic acid,
4-(4-amino-m-tolylazo)-m-toluenesulfonic acid,
4,6-diamino-m-toluenesulfonic acid,
3-amino-o-toluenesulfonic acid,
5-amino-3-chloro-o-toluenesulfonic acid,
3-amino-5-(m-aminobenzamido)-p-toluenesulfonic acid,
3-amino-5-chloro-p-toluenesulfonic acid,
3,5-diamino-p-toluenesulfonic acid,
5-amino-1,2,4,4H-triazole-3-carboxylic acid,
5-amino-2,4-xylenesulfonic acid
and 2-amino-3,5-xylenesulfonic acid.

Coupling components containing at least one 2-haloethylthio or 2-hydroxyethylthio group and, which may be coupled with one of the water-soluble arylamines free of such groups, include 3-methylaminophenyl 2'-chloroethyl sulfide,
3-(dimethylamino)phenyl 2'-chloroethyl sulfide,
3-[bis(2-hydroxyethyl)amino]phenyl 2'-chloroethyl sulfide,
3-methylaminophenyl 2'-chloroethyl sulfide,
3-dimethylaminophenyl 2'-chloroethyl sulfide,
3-[bis(2-hydroxyethyl)amino]phenyl 2'-chloroethyl sulfide,
6-hydroxy-1-naphthyl 2'-chloroethyl sulfide,
4-hydroxy-1-naphthyl 2'-chloroethyl sulfide,
7-hydroxy-2-naphthyl 2'-chloroethyl sulfide,
2-hydroxy-5-methylphenyl 2'-chloroethyl sulfide,
3-hydroxyphenyl 2'-chloroethyl sulfide,
2-dimethylaminophenyl 2'-chloroethyl sulfide, and the 2-hydroxyethyl sulfides and 2-bromoethyl sulfides corresponding to the 2-chloroethyl sulfides listed hereabove.

The water-soluble azo colorants useful in the invention also include those containing more than one azo group. Useful disazo compounds may be formed by the tetrazotization of an aromatic diamine containing two primary amino groups and coupling the tetrazo compound thus formed with two moles of one of the above-defined soluble coupling components. Either the diazonium salt or one of the coupling components must contain a 2-haloethylthio or 2-hydroxyethylthio group. Suitable aromatic diamines containing a 2-haloethylthio group include 3,3'-diaminobiphenyl - 4,4' - bis(2-bromoethyl sulfide, 3,3'-diaminophenyl-4,4'-bis(2-chloroethyl sulfide), and 3,3'-diaminophenyl-4,4'-bis(2 - hydroxyethyl sulfide). Suitable aromatic diamines free of 2-haloethylthio or 2-hydroxyethylthio groups include benzidine, 3,3'-dimethoxybenzidine, 3,3'-dichlorobenzidine, and 4,4'-diaminostilbene.

Another method of forming the disazo or polyazo compounds useful in the invention involves the use of the appropriate above-described process with aromatic amines or diamines containing azo groups.

Useful intermediates of the anthraquinone series are made by reacting an anthraquinone having at least one ionogenic solubilizing group and a displaceable halogen atom, with 2-mercaptoethanol to form a 2-hydroxyethylthioanthraquinonesulfonic acid or carboxylic acid which is converted to the 2-haloethylthio derivative with concentrated hydrochloric or hydrobromic acid or with thionyl chloride. An alternative method involves the reaction of a water-soluble mercaptoanthraquinone with ethylene chlorohydrin to form a solube 2-hydroxyethylthioanthraquinone which can be converted to the 2-haloethylthio dyestuff as described hereabove.

Typical anthraquinone intermediates made by the above reactions include 1,5-dihydroxy-4,8-bis(2-chloroethylthio)-2,6-anthraquinone disulfonic acid;
1,8-dihydroxy-4,5-bis-(2-chloroethylthio)-2,7-anthraquinone disulfonic acid;
1-amino-4-(2-chloroethylthio)-2-anthraquinone sulfonic acid;
1-hydroxy-4-(2-chloroethylthio)-2-anthraquinone sulfonic acid;
1-amino-4-[p-(2-chloroethylthioanilino)]-2-anthraquinone sulfonic acid,
1-hydroxy-4-[p-(chloroethylthioanilino)]-2-anthraquinone sulfonic acid,
1-amino-4-(2-chloroethylthio)-2,6-anthraquinone disulfonic acid,
1-hydroxy-4-(2-chloroethylthio)-2,6-anthraquinone disulfonic acid, N-(4-methylaminoanthraquinonyl)-6-(2-chloroethylthio)metanilic acid,
N-[2,4-bis(2-chloroethylthio)anthraquinonyl]taurine,
1,5-diamino-4,8-bis[p-(2-chloroethylthioanilino)]-2,7-anthraquinone disulfonic acid,
1-acetamido-4-(2-chloroethylthio)-2-anthraquinone sulfonic acid,
1-benzamido-4-(2-chloroethylthio)-2-anthraquinone sulfonic acid,
1-(2-chloroethylthio)-4-anilino-2-anthraquinone sulfonic acid,
1-(2-chloroethylthio)-4-(p-anisidino)-2-anthraquinone sulfonic acid,
1-(2-chloroethylthio)-4-amino-2-anthraquinone sulfonic acid,
1-(2-chloroethylthio)-4-hydroxy-2-anthraquinone sulfonic acid,
1-(2-chloroethylthio)-4-phenoxy-2-anthraquinone sulfonic acid,
1-(2-chloroethylthio)-4-thiophenoxy-2-anthraquinone sulfonic acid,
1,4-bis(2-chloroethylthio)-2-phenoxy-3-anthraquinone sulfonic acid,
1-(2-chloroethylthio)-4-(p-toluenesulfamido)-2-anthraquinone sulfonic acid,
6-(2-chloroethylthio)-N-3-methyl-7H-dibenz[f,ij]isoquinoline-2,7-(3H)dion-6-yl-metanilic acid, and the corresponding 2-bromoethylthio-substituted anthraquinone sulfonic acids.

Useful compounds of the phthalocyanine series are made by heating together a mixture of phthalic acid and nitrophthalic acid by conventional methods, e.g., by heating equimolar amounts of the acids with urea and cupric chloride in o-dichlorobenzene at about 150° C. The nitro groups are then reduced to amino groups. The product is diazotized and reacted with an alkali metal xanthate to form a xanthogenate, which in turn is hydrolyzed in alkaline medium to form the mercaptide, from which the mercaptan is liberated by treatment with acid. The mercaptophthalocyanine is then sulfonated to form a water-soluble mercaptophthalocyanine. Useful sulfonated mercapto phthalocyanines include the disulfonic acid of the 4,4'-dimercaptophthalocyanines of aluminum, chromium, magnesium, copper, cobalt, nickel, iron or zinc, as well as the metal-free compounds and the mono-mercapto-substituted phthalocyanines. The mercaptophthalocyanines are then converted to the corresponding 2-haloethylthio-substituted phthalocyanines by methods described hereabove.

Useful intermediates of the nitro series are those made from substituted diphenylamines and phenylnaphthalenes containing ionogenic solubilizing groups, including 2,4-dinitro-4'-(2-chloroethylthio)-diphenylamine - 3' - sulfonic acid, 2 - nitro-3'-(2-chloroethylthio)-4'-carboxydiphenylamine-4-sulfonic acid, 2-nitro-4'-[p-(2-chloroethylthio)-anilino]-diphenylamine-3,4-disulfonic acid and 1,5-dinitro-2,6-bis[4 - (2 - chloroethylthio) - 3 - sulfoanilino]-naphthalene. These sulfonic acid derivatives are conveniently made by the reaction of the appropriate substituted o-nitrochlorobenzene or -naphthalene with the appropriately substituted diamine (at least one of the compounds containing a sulfonic acid group) in aqueous or alcoholic medium in the presence of an acid-binding agent, such as calcium carbonate, at a temperature of about 100° C. The amino group is converted to the 2-chloroethylthio group by the methods described above.

Thioureas from which the isothiuronium salts of the invention can be made include thiourea, ethylene thiourea, N,N-dimethyl thiourea, N,N,N'-trimethyl thiourea and N,N,N',N'-tetramethyl thiourea.

Isothiuronium salts are formed from the water-soluble colorants containing a 2-haloethylthio group according to the following equation:

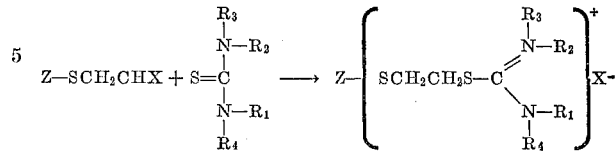

In the above equation Z, $R_1$, $R_2$, $R_3$ and $R_4$ have the values given aforesaid. The reaction is conducted by heating the 2-haloethyl sulfide with a concentrated aqueous solution of the thiourea at 80–100° C. The product isothiuronium salt is isolated by adding a non-solvent, e.g., acetone, or an inorganic salt, e.g., sodium chloride, and filtering off the precipitated product.

The new dyestuffs of the invention are especially suited for the coloration of cellulosic textile materials such as cotton, linen and viscose rayon, although they also may be effectively applied to silk, wool, nylon and the like.

The dyestuffs are applied by treating the textile material in an aqueous solution (which may be a thickened printing paste) of the dyestuff in the presence of an acid-binding agent, for example, sodium hydroxide, sodium phosphate, or sodium carbonate. The acid-binding agent may be added to the dye bath either prior to, simultaneously with, or after the addition of the dyestuff.

The dyestuff solution may contain commonly used dye bath adjuvants such as sodium chloride, sodium sulfate, sodium alginate, urea or water-soluble alkyl ethers of cellulose.

The printing paste may contain commonly used adjuvants, such as urea, and thickening agents, e.g., methyl cellulose, starch and locust bean gum and sodium alginate.

Dyeing in the presence of the acid-binding agent is preferably carried out at elevated temperatures, for example, at temperatures between 60° C. and the boiling point of the dyestuff solution in order to improve the exhaustion and fixation of the dyestuff.

The textile material printed with printing paste containing an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent, i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature, for example, at 100° C. or higher, for a short period of time after application of the dyestuff and acid-binding agent to fix the dyestuff on the textile material.

The above techniques may be modified by substituting for the acid-binding agent a substance which on heating or steaming generates an acid-binding agent. Such substances include alkali metal bicarbonates which on heating yield alkali metal carbonates.

The fastness to washing or subsequent wet processing of the colorations produced using my new dyestuffs is improved by a scouring treatment, e.g., applying a hot aqueous solution of soap and sodium carbonate followed by rinsing in hot water prior to drying.

The new dyestuffs may also be applied to silk, wool, regenerated protein, nylon and modified polyacrylonitrile textile materials by using the conventional dyeing methods for those textile materials, i.e., dyeing from weakly acid dyebath solutions, for example, dyestuff solutions containing formic acid or ammonium sulfate at a temperature above 80° C. When dyeing proteinacious fibers in acidic medium, it is preferable to use a temperature between 80° C. and 100° C. This treatment may be followed by a hot treatment with a dilute solution of soap and soda ash.

My invention is further illustrated by the following examples:

Example I

A suspension of 15.8 g. (100% basis, 0.030 mole) of the product obtained by coupling o-(2-hydroxyethylthio)-aniline with R salt, and 50 ml. of 48% hydrobromic acid is stirred under reflux for 4 hours. After cooling, the product is filtered off, washed with cold 20% aqueous sodium chloride solution until neutral, and dried over calcium chloride. The dry product weighs 15.1 g.

A mixture of 11.6 g. (100% basis, 0.020 mole) of the 2-bromoethylsulfide so obtained, 6 ml. of water, and 7.6 g. (0.10 mole) of thiourea is stirred at 95° C. for 15 minutes. After cooling, the reaction mixture is treated with 100 ml. of acetone. The solid is filtered off, washed well with acetone, and dried at 50° C. under vacuum. There is obtained 12.8 g. of bluish-red dye.

Example II

Cotton is padded with a 2% solution of the dye prepared in Example I, then dried. A sample of the cloth is padded with an aqueous solution containing 5 g. of sodium hydroxide and 300 g. of sodium chloride per liter, then steamed for 60 seconds. After rinsing and soaping, the dyed fabric exhibits very good washfastness.

A second piece of cloth padded with the dye solution is again padded with a solution containing 20 g. of sodium carbonate with 200 g. of urea per liter. After drying, the fabric is held for 3 minutes at 150° C. A dyeing of good wetfastness is obtained after rinsing and soaping the treated cloth.

Example III

A suspension of 0.030 mole of the product obtained by coupling the bis-diazonium salt of disodium 4,4'-diamino-3,3'-biphenyldisulfonate with 2 molar amounts of p-(2-hydroxyethylthio)-N-methylaniline, and 100 ml. of 48% hydrobromic acid is heated and stirred under reflux for 3 hours. The mixture is cooled and the product is filtered off, washed with cold 20% aqueous sodium chloride solution until neutral, and dried over calcium chloride.

A mixture of 0.020 mole of the bis(2-bromoethylsulfide) so obtained, 20.4 g. (0.20 mole) of 2-imidazolidinethione and 16 ml. of water is stirred at 95° C. for 20 minutes. After treating the cooled reaction mixture with acetone according to the procedure in Example I and drying, there is obtained 20.8 g. of orange colored dye.

Example IV

The procedure of Example II is followed using a 2% solution of the dye of Example III. The fastness of the dyeing to soaping is once again greater than that of the colorant from which the new dye is prepared.

Example V

The procedure of Example III is repeated using o-(2-hydroxyethylthio)aniline and 2-imidazolidinethione as starting materials. There is obtained a good yield of violet dye.

Example VI

The procedure of Example III is repeated using 2-[3-chloro-4-(2 - bromoethylthio)phenylazo] - 1,8 - dihydroxy-3,6-naphthalenedisulfonic acid and excess N,N,N'-trimethylthiourea as starting materials. There is obtained a good yield of violet dye.

Example VII

The procedure of Example III is repeated using bis-diazonium salt of disodium 4,4'-diamino-3,3'-biphenyl-disulfonate and thiourea as starting materials. There is obtained a good yield of red dye.

Example VIII

The procedure of Example III is repeated using 8-[4-(2-bromoethylthio)phenylazo] - 5 - amino - 2 - naphthalene sulfonic acid and N,N,N',N'-tetramethylthiourea as starting materials. There is obtained a good yield of orange dye.

Example IX

The procedure of Example III is repeated using 2-[2-trifluoromethyl-4-(2-chloroethylthio) - phenylazo]-6-amino-1-naphthol-3,5-disulfonic acid and thiourea as starting materials. There is obtained a good yield of violet dye.

Example X

A mixture of 100 ml. of concentrated hydrochloric acid and 17.9 g. (0.030 mole) of disodium 5-dihydroxy-4,8-bis-(2 - hydroxyethylthio) - 2,6 - anthraquinonedisulfonate is stirred under reflux for 4 hours. After cooling the solid is filtered off, washed until neutral with cold 20% aqueous sodium chloride solution and dried over calcium chloride. A mixture of 0.20 mole of the bis(2-chloroethylsulfide) so obtained, 7.6 g. (0.10 mole) of thiourea, and 6 ml. of water is stirred at 95° C. for 20 minutes. After cooling and washing the product well with acetone and drying, there is obtained 15.1 g. of reddish-brown colored dye.

Example XI

The procedure of Example II is followed using a 2% solution of the dye of Example X. The fastness of the dyeing to soaping is once again greater than that of the colorant from which the new dye is prepared.

Example XII

A suspension of 75 ml. of concentrated hydrochloric acid and 10.0 g. (0.020 mole) of disodiumamino 4-(2-hydroxyethylthio)-2,6-anthraquinone-disulfonate is stirred under reflux for 3 hours. After cooling the reaction mixture, filtering off the product and washing it with cold 20% aqueous sodium chloride solution until the washes are neutral, the product is dried over calcium chloride.

A mixture of 0.020 mole of the 2-chloroethylsulfide so obtained, 7.6 g. (0.10 mole) of thiourea, and 6 ml. of water is stirred at 95° C. for 20 minutes. After cooling and adding 200 ml. of acetone to the reaction mixture, the solid is filtered off, washed with 200 ml. of acetone, and dried at 50° C. under vacuum. There is obtained 10.3 g. of red colored dye.

Example XIII

The procedure of Example II is followed using a 2% solution of the dye of Example XII. The fastness of the dyeing to soaping is once again greater than that of the colorant from which the new dye is prepared.

Example XIV

The procedure of Example XII is repeated using 4-(2-bromoethylthio)-1-(4-chlorobenzamido) - 2 - anthraquinonesulfonic acid and 2-imidazolidine thione as starting materials. There is obtained a good yield of reddish-orange dye.

Example XV

The procedure of Example XII is repeated using 1-amino-4-[4-(2 - chloroethylthio) - 3 - methylanilino] - 2-anthraquinonesulfonic acid and thiourea as starting materials. There is obtained a good yield of blue dye.

Example XVI

The procedure of Example XII is repeated using 1,5-bis-methylamino-4,8 - bis[4 - (2 - chloroethylthio)anilino]-2,7-anthraquinonedisulfonic acid as starting materials. There is obtained a good yield of greenish-blue dye.

Example XVII

The procedure of Example XII is repeated using 1-(2-chloroethylthio)-4-(4-nitrophenoxy) - 2 - anthraquinonesulfonic acid and thiourea as starting materials. There is obtained a good yield of orange-yellow dye.

*Example XVIII*

The procedure of Example XII is repeated using 4,5-bis(2-chloroethylthio)-1,8-dimethoxy - 2,7 - anthraquinonedisulfonic acid and 2-imidazolidine thione as starting materials. There is obtained a good yield of orange-brown dye.

*Example XIX*

A mixture of 0.020 mole of copper 4,4'-bis(2-hydroxyethylthio)-4'',4'''-phthalocyaninedisulfonic acid and 100 ml. of concentrated hydrochloric acid is stirred under reflux for 3 hours. The mixture is cooled and the solid is filtered off, washed with 20% aqueous sodium chloride to neutrality, and then dried over calcium chloride.

A mixture of the bis(2-hydroxyethylthio)phthalocyanine, 40.8 g. (0.40 mole) of 2-imidazolidinethione, and 33 ml. of water is stirred at 95° C. for 30 minutes. After cooling, the mixture is treated with an excess of acetone and the solid product is filtered off, washed well with acetone, and dried at 50° C. under vacuum. A water-soluble blue dye is obtained in excellent yield.

*Example XX*

The procedure of Example II is followed using a 2% solution of the dye of Example XIX. The fastness of the dyeing to soaping is once again greater than that of the colorant from which the new dye is prepared.

*Example XXI*

2-[4-(2-hydroxyethylthio)anilino]-3,5 - dinitrobenzenesulfonic acid is prepared by condensing molecular proportions of p-(2-hydroxyethylthio)-aniline with 2-chloro-3,5-dinitrobenzenesulfonic acid. A suspension of 8.3 g. (0.02 mole) of this material in 125 ml. of 48% hydrobromic acid is stirred under reflux for 4 hours. After cooling, the product is filtered off, washed until neutral with a cold 20% aqueous solution of sodium bromide, and dried over calcium chloride.

A mixture of 4.8 g. (0.010 mole) of 2[4-(2-bromoethylthio)anilino]-3,5-dinitrobenzenesulfonic acid, 13.2 g. (0.10 mole) of N,N,N',N'-tetramethylthiourea and 22 ml. of water is stirred at 95° C. for 15 minutes. After cooling, the reaction mixture is treated with 200 ml. of acetone and the precipitated product is filtered off, washed well with acetone, and dried at 50° C. under vacuum. There is obtained 5.8 g. (95%) of yellow colored dye.

*Example XXII*

The procedure of Example II is followed using a 2% solution of the dye of Example XXI. The fastness of the dyeing to soaping is once again greater than that of the colorant from which the new dye is prepared.

I claim:
1. A dyestuff of the formula:

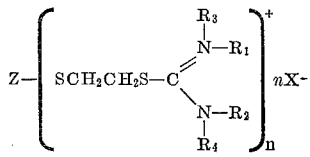

wherein Z is a water-soluble dyestuff moiety selected from the group consisting of azo, anthraquinone, phthalocyanine and nitro, said dyestuff moiety containing at least one ionogenic solubilizing group; $R_1$ and $R_2$, as individual substituents, are members selected from the group consisting of hydrogen and lower alkyl and, taken collectively, represent an alkylene bridge having from 2 to 3 carbon atoms, said bridge connecting the N atoms to which $R_1$ and $R_2$ are attached; $R_3$ and $R_4$ are members selected from the group consisting of hydrogen and lower alkyl; $n$ is an integer having a value of from 1 to 3; and X is a member selected from the group consisting of chlorine and bromine.

2. A dyestuff of claim 1 wherein Z is azo, $R_1$, $R_2$, $R_3$, and $R_4$ are hydrogen, $n$ is one and X is bromine.

3. A dyestuff of claim 1 wherein Z is anthraquinone, $R_1$, $R_2$, $R_3$ and $R_4$ are hydrogen, $n$ is two and X is bromine.

4. A dyestuff of claim 1 wherein Z is phthalocyanine, $R_1$, $R_2$, $R_3$ and $R_4$ are hydrogen, $n$ is two and X is bromine.

5. A dyestuff of claim 1 wherein Z is nitro, $R_1$, $R_2$, $R_3$ and $R_4$ are hydrogen, $n$ is one and X is bromine.

References Cited in the file of this patent

UNITED STATES PATENTS

| | | |
|---|---|---|
| 2,645,641 | Renfrew et al. | July 14, 1953 |
| 2,664,427 | Randall et al. | Dec. 29, 1953 |
| 2,829,129 | Semmens et al. | Apr. 1, 1958 |